United States Patent [19]
Inada

[11] Patent Number: 5,237,868
[45] Date of Patent: Aug. 24, 1993

[54] THERMAL FLOW SENSOR FOR COMPENSATING GRADIENT OF FLOW RATE CHARACTERISTICS

[75] Inventor: Masanori Inada, Hyogo, Japan

[73] Assignee: Mitsubishi Denki Kabushiki Kaisha, Tokyo, Japan

[21] Appl. No.: 814,460

[22] Filed: Dec. 30, 1991

[30] Foreign Application Priority Data

Dec. 28, 1990 [JP] Japan ................. 2-417784

[51] Int. Cl.⁵ .............................................. G01F 1/68
[52] U.S. Cl. ................................................ 73/204.19
[58] Field of Search ........... 73/204.15, 204.18, 204.19, 73/118.2

[56] References Cited

U.S. PATENT DOCUMENTS 4,400,974  8/1983  Nishimura et al. ............. 73/204.15
4,907,446  3/1990  Inada et al.

FOREIGN PATENT DOCUMENTS 0018758  2/1981  Japan ................... 73/204.18
173832  10/1989  Japan.

Primary Examiner—Herbert Goldstein
Attorney, Agent, or Firm—Sughrue, Mion, Zinn, Macpeak and Seas

[57] ABSTRACT

A thermal flow sensor comprising a bridge circuit positioned in a fluid and including a platinum wire as a thermal resistor, an air temperature sensor and a pair of resistors, and a temperature control circuit for controlling a current flowing through the platinum wire to keep the bridge circuit in a thermally balanced condition. A voltage $V_h$ depending on a flow rate and output from the bridge circuit is input to a non-inverting input terminal of an operational amplifier. A sum of the currents output from the first and second constant current circuits connected to the non-inverting and inverting input terminals of the operational amplifier is set to zero by a constant current control circuit when the output voltage $V_h$ is equal to or less than a predetermined value and gradually increases from zero with an increase in the output voltage $V_h$ when $V_h$ is higher than the predetermined value.

4 Claims, 10 Drawing Sheets

Fig. 1(a)
Fig. 1(b) PRIOR ART
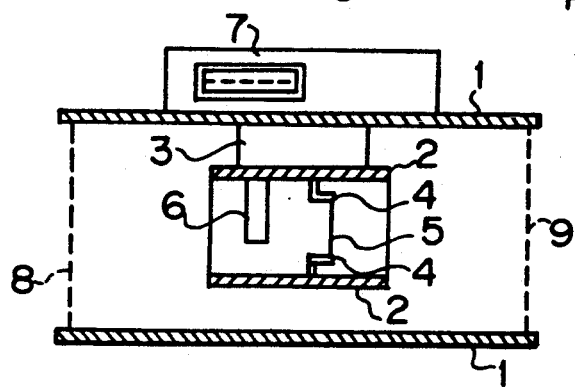
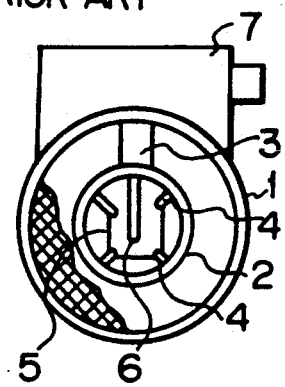
Fig. 2 PRIOR ART
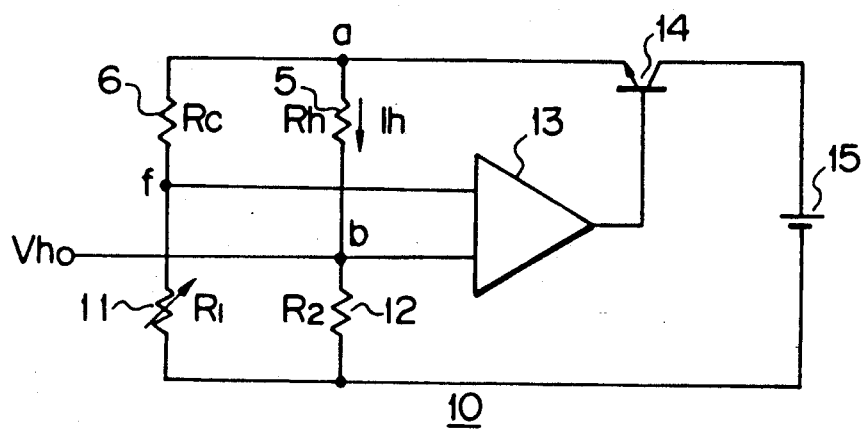
Fig. 3 PRIOR ART
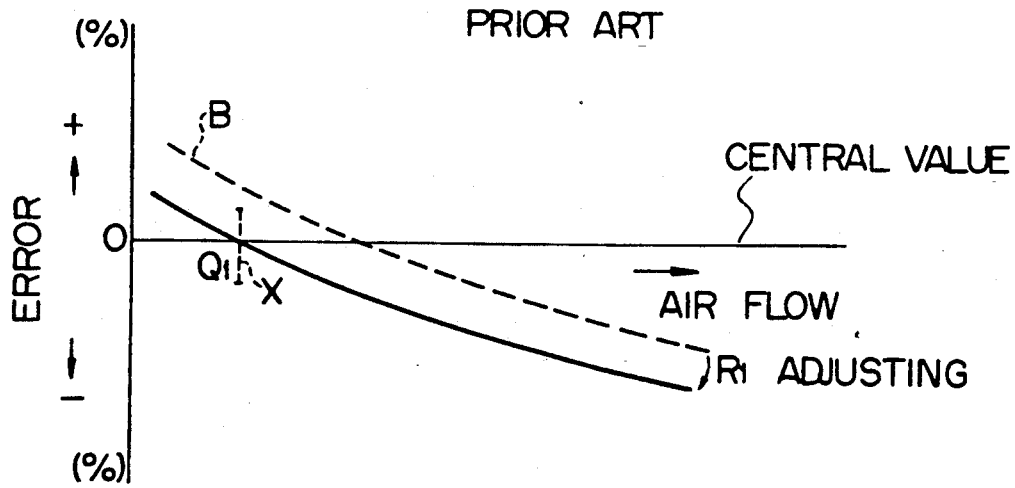

THERMAL FLOW SENSOR FOR COMPENSATING GRADIENT OF FLOW RATE CHARACTERISTICS

BACKGROUND OF THE INVENTION

1. Field of the Invention

The present invention relates to a thermal flow sensor for detecting a fluid such as air by utilizing a thermal resistor and heating resistor, etc.

2. Description of the Prior Art

A flow sensor of such a type which detects a flow rate from a thermally balanced condition of a bridge circuit including a heating resistor and which is provided in a fluid such as air is known. The structure of a conventional air flow sensor using a platinum wire as a heating resistor will be explained with reference to FIG. 1 and FIG. 2. FIGS. 1(a) and 1(b) are vertical sectional side elevation and front elevation views of a conventional thermal flow sensor. FIG. 2 is a circuit diagram indicating a temperature control circuit of the conventional thermal flow sensor.

In FIGS. 1(a) and 1(b), the conventional thermal flow sensor is provided with a measurement tube (2) supported by a supporting member (3) at a predetermined position within a housing (1) forming the main path for a fluid such as air. A plurality of heating wire supporting members (4) are provided at the inner surface of measurement tube (2). A platinum wire (5) is supported in a plane orthogonal to the flow of air by the heating wire supporting members (4). An air temperature sensor (6) is provided within the measurement tube (2). Electrical connecting lead wires of the platinum wire (5) and the air temperature sensor (6) are extended to the inside of a control circuit (7) provided on the outer surface of the housing (1) by way of through-holes (not illustrated) formed respectively in the measurement tube (2), the supporting member (3) and the housing (1), and are connected with a temperature control circuit provided within the control circuit (7). Protection nets (8) and (9) are provided at both ends of the housing (1).

In FIG. 2, the temperature control circuit (10) has a bridge circuit formed by the platinum wire (5), the air temperature sensor (6) and resistors (11) and (12) and both input terminals of a differential amplifier (13) are connected to the intermediate connecting points b and f of the bridge circuit. An output terminal of the differential amplifier (13) is connected to the base of a transistor (14), while the emitter of the transistor (14) is connected to the connecting point a of the bridge circuit with the collector of the transistor (14) being connected to a positive terminal of a DC power supply (15). The temperature control circuit (10) executes temperature control so that the bridge circuit is capable of maintaining a predetermined thermally balanced state. It is assumed that a resistance value of the platinum wire (5) is defined as Rh, a resistance value of the air temperature sensor (6) as Rc and resistance values of the resistors (11) and (12) as $R_1$, $R_2$.

Next, operations of the conventional thermal flow sensor will be explained with reference to FIG. 3, which shows characteristics indicating operations of the conventional thermal flow sensor. In FIG. 3, the horizontal axis indicates an air flow rate, while the vertical axis indicates an error (%).

Operation of the temperature control circuit (10) is well known and, as such, explanation thereof is omitted here. When the voltages at the connecting points b and f become equal, the bridge circuit attains a balanced state. At this time, a current $I_h$ corresponding to the flow rate flows through the platinum wire (5) and the voltage $V_h$ of the connecting point b becomes equal to $I_h \times R_2$. This voltage $V_h$ is used as a flow rate signal.

In order to correct errors in a detected flow rate due to scattering in resistance values and resistance-temperature coefficients of the platinum wire (5) and the air temperature sensor (6) and resistance values of the resistors (11) and (12), it is usual for a detected flow rate characteristic to be transformed in parallel by adjusting the resistance value $R_1$ of the resistor (11) to set a detected value of a predetermined flow rate (usually, a comparatively low flow rate value) to a target value.

FIG. 3 shows a detected flow rate characteristic explaining such compensation, where the resistance value $R_1$ of the resistor (11) is adjusted so that a characteristic curve $\beta$ before adjustment by way of the resistor (11) is set within the range of the target value X at a predetermined flow rate $Q_1$.

In such a thermal flow sensor including the temperature control circuit (10), the resistance value $R_1$ of the resistor (11) is adjusted to improve accuracy in measurement. However, it would be impossible to adjust unevenness in size of the housing (1) and the measurement tube (2), scattering of these elements in a relative position, deviation of a center axis of the measurement tube (2) from the direction of flow of the fluid, and a gradient of a flow rate characteristic mainly resulting from scattering and deviation in structure and size of the platinum wire (5) (dependence of deviation from a center value of detected characteristic in each flow rate on a flow rate). Further, measurement accuracy cannot be improved in a flow rate at a point other than the adjusted flow rate point $Q_1$ explained above, particularly, in a flow rate at a point separated far from the adjusted flow rate point $Q_1$. Accordingly, a gradient of a flow rate characteristic is adjusted, in addition to the adjustment by the resistor (11) explained above.

An adjustment of the gradient of a flow rate characteristic executed in the prior art will be explained with reference to FIG. 4 and FIGS. 5(a)–5(c). FIG. 4 is a circuit diagram indicating a gradient correcting circuit of a conventional thermal flow sensor, while FIGS. 5(a)–5(c) and FIGS. 6(a)–6(c) are characteristic diagrams indicating operation of the gradient correcting circuit of the prior art.

In FIG. 4, the gradient correcting circuit comprises a substracting circuit (16), a voltage dividing circuit (23), an amplifying circuit (26) and an arithmetic circuit (31).

The substracting circuit (16) comprises resistors (17), (18), (20), (21) and (22) and an operational amplifier (19). A non-inverting input terminal of the operational amplifier (19) is grounded through the resistor (18) and is also connected through the resistor (17) to the connecting point b of the bridge circuit of the temperature control circuit (10). A preset voltage $V_{ref}$ is applied through the resistor (20) to an inverting input terminal of the operational amplifier (19). The resistor (21) is connected between the inverting input terminal and an output terminal of this operational amplifier (19) and this output terminal is grounded through the resistor (22). The resistance values of the resistors (17), (18), (20), (21) and (22) are defined respectively as $R_3$, $R_4$, $R_5$, $R_6$ and $R_7$.

The voltage dividing circuit (23) divides an output voltage $V_1$ of the substracting circuit (16) with resistors (24) and (25). A series circuit of these resistors (24) and

(25) is connected between an output terminal of the substracting circuit (16) and the ground. The resistance values of the resistors (24) and (25) are defined respectively as $R_8$ and $R_9$.

An output voltage $V_2$ of the voltage dividing circuit (23) obtained at the connecting point between the resistors (24) and (25) is applied to the non-inverting input terminal of the operational amplifier (27) in the amplifying circuit (26). The inverting input terminal of the operational amplifier (27) is grounded through a resistor (28). An output voltage $V_3$ of the amplifying circuit (26) is input to the non-inverting input terminal of an operational amplifier (34) through a resistor (33) within the arithmetic circuit (31). The resistance values of the resistors (28), (29) and (30) are defined respectively as $R_{10}$, $R_{11}$ and $R_{12}$.

The arithmetic circuit (31) comprises resistors (32), (33), (35) and (36) and the operational amplifier (34). The output voltage $V_1$ of the subtracting circuit (16) is input to an inverting input terminal of the operational amplifier (34) through the resistor (35) and the resistor (36) is connected between an output terminal and the inverting input terminal of the operational amplifier (34). Moreover, a non-inverting input terminal of the operational amplifier (34) is connected through the resistor (32) to the connecting point b of the bridge circuit of the temperature control circuit (10). A voltage $V_0$ is output from the output terminal of the operational amplifier (34). The resistance values of the resistors (32), (33), (35) and (36) are defined respectively as $R_{13}$, $R_{14}$, $R_{15}$ and $R_{16}$.

Operation of each circuit described above will be explained with reference to FIGS. 5(a)-5(c).

The output voltage $V_1$ of the subtracting circuit (16) satisfies the following equation in accordance with the resistance values $R_3$, $R_4$, $R_5$ and $R_6$ of the resistors (17), (18), (20) and (21):

$$V_1 = \{R_4/(R_3+R_4)\} \times \{(R_5+R_6)/R_5\} \times V_h - \{(R_6/R_5) \times V_{ref}\}$$

When the resistance values are set adequately, for example, such as $R_3=R_4$ and $R_5=R_6$, the following result can be obtained:

$$V_1 = V_h - V_{ref}$$

Since the operational amplifier (19) is operated only with the power supply voltage having positive polarity, the output voltage $V_1$ of the operational amplifier (19) does not become negative, and, when $V_h < V_{ref}$, $V \approx 0$, showing a characteristic $V_1$ indicated in FIG. 5(a). ($V_1$ becomes about 0.3 V due to an output voltage saturation characteristic of the operational amplifier (19), but, in this case, $V_1$ is defined here to be nearly equal to zero.)

The output voltage $V_2$ of the voltage dividing circuit (23) is expressed by the following equation in accordance with the resistance values $R_8$ and $R_9$ of the resistors (24) and (25) in the voltage dividing circuit (23):

$$V_2 = \{R_9/(R_8+R_9)\} \times V_1 (V_1 \approx 0, \text{ when } V_h < V_{ref}).$$

The voltage $V_2$ is input to the amplifying circuit (26) and the output voltage $V_3$ of the amplifying circuit (26) is expressed as follows in accordance with the resistance values $R_{10}$ and $R_{11}$ of the resistors (28) and (29):

$$V_3 = \{(R_{10}+R_{11})/R_{10}\} \times V_2$$
$$= \{(R_{10}+R_{11})/R_{10}\} \times \{R_9/(R_8+R_9)\} \times V_1$$

The arithmetic circuit (31) receives the output voltage $V_h$ of the temperature control circuit (10), the output voltage $V_3$ of the amplifying circuit (26) and the output voltage $V_1$ of the subtracting circuit (16) and the output voltage $V_0$ satisfies the following equation in accordance with the resistance values $R_{13}$, $R_{14}$, $R_{15}$ and $R_{16}$ of the resistors (32), (33), (35) and (36):

$$V_0 = \{(R_{15}+R_{16})/R_{15}\} \times \{R_{14}/(R_{13}+R_{14})\} \times V_h +$$
$$\{(R_{15}+R_{16})/R_{15}\} \times \{R_{13}/(R_{13}+R_{14})\} \times V_3 -$$
$$(R_{16}/R_{15}) \times V_1.$$

When the resistance values are set to adequate values, for instance, such as $R_{13}=R_{14}$ and $R_{15}=R_{16}$, then the following result can be obtained:

$$V_0 = V_h + V_3 - V_1$$

From the equations of those output voltages $V_1$, $V_2$, $V_3$ and $V_h$ and the preset voltage $V_{ref}$, the following equation can be obtained:

$$V_0 = V_h + \{\{R_9/(R_8+R_9)\} \times \{(R_{10}+R_{11})/R_{10}\} - 1\}$$
$$\times (V_h - V_{ref})(V_0 \approx V_h \text{ when } V_h < V_{ref})$$

In the above equation, when the resistance values $R_8$, $R_9$, $R_{10}$ and $R_{11}$ are set to adequate values, for instance, $R_8=R_9$ and $R_{10}=R_{11}\times(1\pm a)$, then $$V_0 = V_h + \{(1/2) \times (2 \pm a) - 1\} \times (V_h - V_{ref}) \quad (1)$$
$$= V_h \pm (1/2) \times a \times (V_h - V_{ref})$$
$$(V_0 \approx V_h \text{ when } V_h < V_{ref})$$

Therefore, when $V_h < V_{ref}$, the output voltage of the arithmetic circuit (31) $V_0 = V_h$ irrespective of the resistance values $R_{10}$ and $R_{11}$, and, when $V_h > V_{ref}$, a value obtained by multiplying the value $(V_h - V_{ref})$ with a factor determined by the ratio of the resistance values $R_{10}$ and $R_{11}$ is added to or subtracted from $V_h$, particularly, when $R_{10}=R_{11}$, $V_0=V_h$ irrespective of which $V_h$ and $V_{ref}$ is larger.

FIG. 5(a) is a diagram indicating characteristics of the voltages $V_0$, $V_1$, $V_2$ and $V_h$ described above. The output voltage $V_3$ of the amplifying circuit (26) changes in response to the output voltage $V_1$ of the subtracting circuit (16) in accordance with a value determined by the ratio of the resistance values $R_{10}$ and $R_{11}$. The output voltage $V_0$ of the arithmetic circuit (31) is nearly equal to $V_h$ when $V_h < V_{ref}$, and changes on the basis of the characteristics of $V_0=V_h$ when $V_h > V_{ref}$.

FIG. 5(b) is a diagram indicating a relationship between an air flow rate and the output voltage $V_h$ of the temperature control circuit (10) and the output voltage $V_0$ of the arithmetic circuit (31). FIG. 5(c) is a diagram indicating a relationship between an air flow rate and a detected error in air flow rate which depends on the output voltages $V_h$ and $V_0$. As shown in FIG. 5(b), the output voltage $V_0$ of the arithmetic circuit (31) can be arbitrarily changed to a plus (+) or minus (−) side with respect to the output voltage $V_h$ of the temperature control circuit (10) in accordance with the resistance values $R_{11}$ and $R_{12}$ only when a flow rate is higher than the air flow rate $Q_{ref}$ corresponding to the preset voltage $V_{ref}$.

Accordingly, as shown in FIG. 5(c), an error detected by the output voltage $V_h$ of the temperature control circuit (31) can be adjusted to a $+\alpha$ side when such an error is negative and to a $-\alpha$ side when such an error is positive, when a flow rate is larger than the air flow rate $Q_{ref}$.

In such a manner as described above, after an error-flow rate characteristic is transformed in parallel so as to enter the range of a target value X at a predetermined flow rate $Q_1$, the gradient of such a characteristic is corrected with respect to the flow rate $Q_{ref}$ having a relatively small error and located near the flow rate $Q_1$ as a flow rate at a reference point.

A conventional gradient correcting circuit of a thermal flow sensor as explained above has such problems as are explained hereunder.

The correcting circuit is constituted such that, when the output voltage $V_h$ of the temperature control circuit (10) is lower than the preset voltage $V_{ref}(V_h<V_{ref})$, the output voltage $V_o$ of the arithmetic circuit (31) becomes equal to the output voltage $V_h$ of the temperature control circuit (10). In an actual operation, when the operational amplifier (19) is saturated, it is necessary to supply simultaneously as a sink current from the output terminal of the operational amplifier (19), a current of $V_{ref}/(R_5+R_6)$ through the resistors (20) and (21) from the preset voltage $V_{ref}$ and a current of $V_o/(R_{15}+R_{16})$ through the resistors (36) and (35) from the output terminal of the arithmetic circuit (31). Because of the structure of an output circuit of the arithmetic circuit (19) and characteristics of semiconductor elements forming the output circuit, the output voltage $V_o$ does not become 0 when the sink current flows, and a saturated voltage $V_{sat}$ of about 0.3 V usually remains at the output of the arithmetic circuit. In order to reduce $V_{sat}$, a resistor having a relatively small resistance value such as the resistor (22) shown in FIG. 4 is connected as a pull-down resistor between the output terminal of the operational amplifier (19) and the ground.

However, even if such a pull-down resistor (22) is used, the output voltage of the operational amplifier (19) cannot be reduced to zero and a residual voltage $V_s$ of several tens of millivolts still remains.

Explanation of operation of the conventional apparatus made with reference to FIG. 5 is made on the assumption that the residual voltage $V_s \approx 0$. Due to the influence of a residual voltage $V_s$, an error $E_s$ resulting from such a residual voltage $V_s$ actually appears as shown in FIGS. 6(a)-6(c). Particularly, when a flow rate detected by the thermal flow sensor is at a very low level (for instance, a flow rate detected during an idle condition in an internal combustion engine), a detected error becomes 1% when a voltage is at a level of about 3 mV-5 mV. Accordingly, an error resulting from a residual voltage $V_s$ must be taken into account.

SUMMARY OF THE INVENTION

The present invention has been proposed to solve such problems as described above and it is an object of the present invention to provide a thermal flow sensor wherein an output voltage $V_o$ of an arithmetic circuit is exactly equal to an output voltage $V_h$ of a temperature control circuit when $V_h<V_{ref}$ and wherein a gradient of a characteristic of the output voltage $V_o$ can be easily corrected by means of a simple circuit structure with a high degree of accuracy.

In order to attain such an object as described above, a thermal flow sensor of the present invention comprises a temperature control means which includes a bridge circuit having a thermal resistor and a plurality of resistors arranged in a fluid to control a current flowing through the thermal resistor so as to cause such a bridge circuit to maintain a predetermined thermally balanced state; an operational amplifier which receives at a non-inverting input terminal a voltage output from the bridge circuit of the temperature control means in response to a flow rate; first and second constant current circuits respectively connected to the non-inverting input terminal and an inverting input terminal of the operational amplifier, with a sum of the currents output from the first and second constant current circuits being controlled in accordance with an external signal resulting in the operational amplifier having a predetermined output voltage characteristic.

In an embodiment of the flow sensor of the present invention, a sum of the currents output from the first and second constant current circuits is zero when a voltage output from the bridge circuit is equal to a predetermined value or less and gradually increases from zero as the voltage output from the bridge circuit rises when the output voltage of bridge circuit is larger than the predetermined value. The predetermined value can be adjusted by the external signal.

In another embodiment of the flow sensor of the present invention, a sum of the output currents of the first and second constant current circuits is zero when an output voltage of the bridge circuit is equal to or higher than a predetermined value and gradually increases from zero as the voltage output from the bridge circuits drops when the output of the bridge circuit is lower than the predetermined value. The predetermined value can be adjusted by the external signal.

In still another embodiment of the flow sensor of the present invention, third and fourth constant current circuits respectively connected to the non-inverting input and the inverting input of the operational amplifier are further provided and a sum of the output currents of the first and second constant current circuits and a sum of the output currents of the third and fourth constant current circuits can be controlled in accordance with a voltage output from the bridge circuit whereby a ratio of the current values of the first and second constant current circuits can be set.

BRIEF DESCRIPTION OF THE DRAWINGS

FIGS. 1(a) and 1(b) are diagrams respectively indicating a vertical sectional view and a top view of a conventional thermal flow sensor;

FIG. 2 is a circuit diagram indicating a temperature control circuit used with the thermal flow sensor of FIG. 1;

FIG. 3 is a characteristic diagram indicating operation of the thermal flow sensor shown in FIG. 1;

DETAILED DESCRIPTION OF PREFERRED EMBODIMENTS

Figure 4:
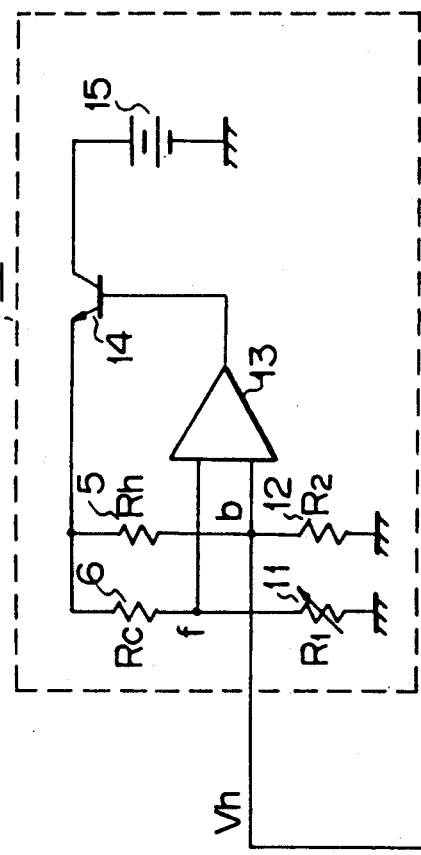
FIG. 4 is a circuit diagram indicating a conventional thermal flow sensor including a gradient correcting circuit.
Figure 4:
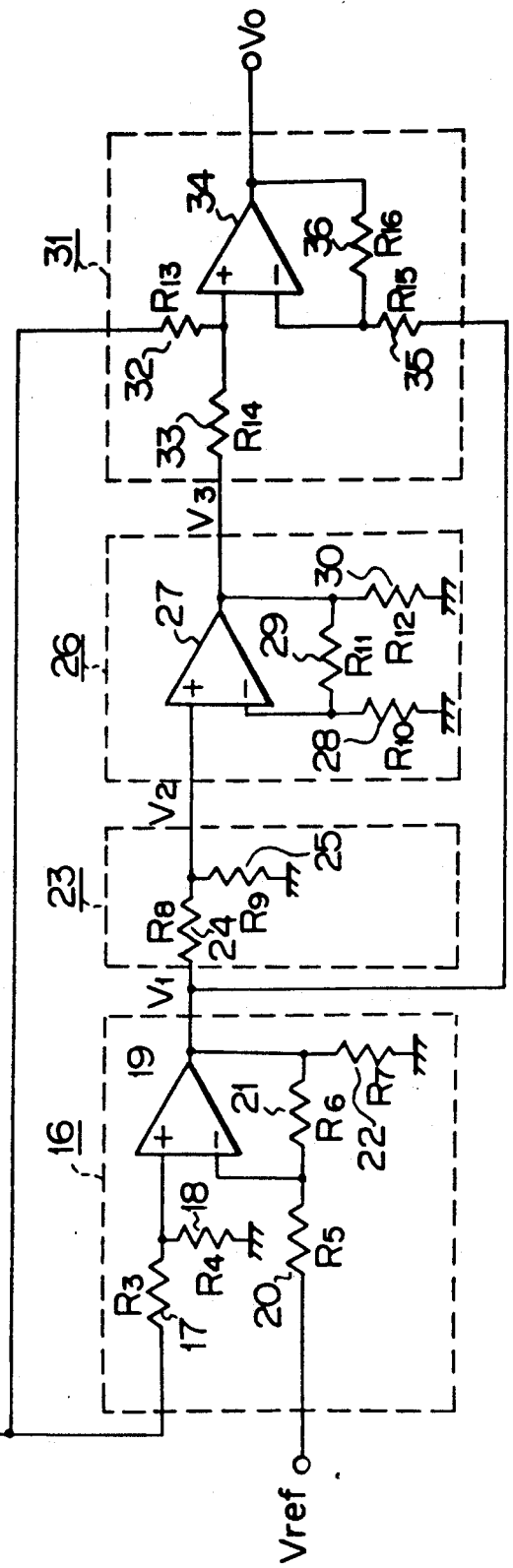
Figure 5A:
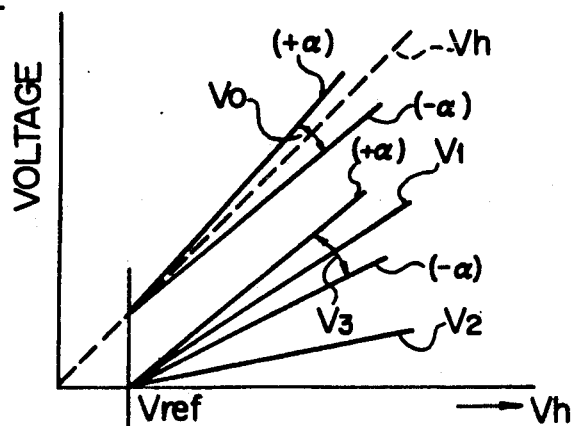
FIGS. 5(a)-5(c) are a characteristic diagram indicating operation of the thermal flow sensor shown in FIG. 4.
Figure 5B:
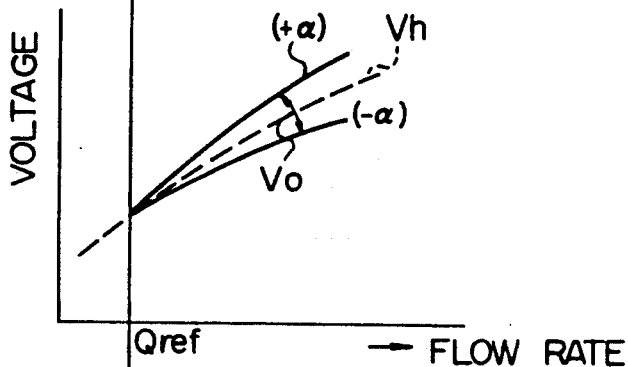
Figure 5C:
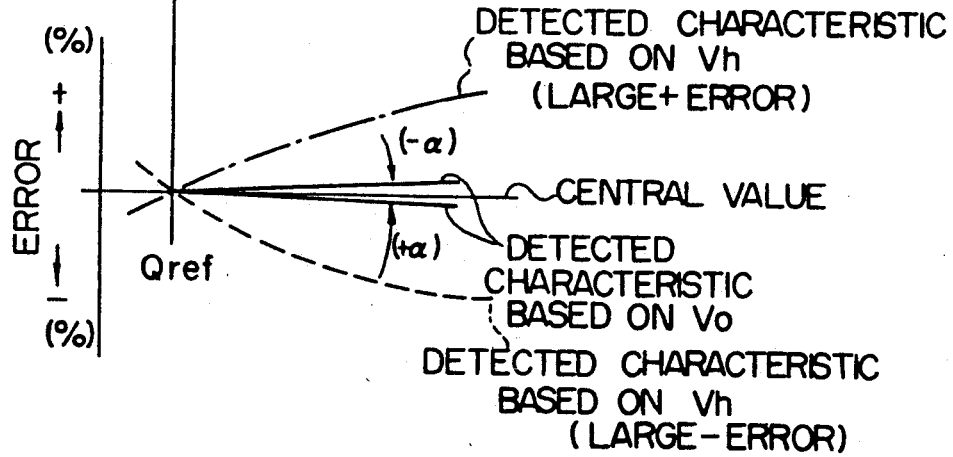
Figure 6:
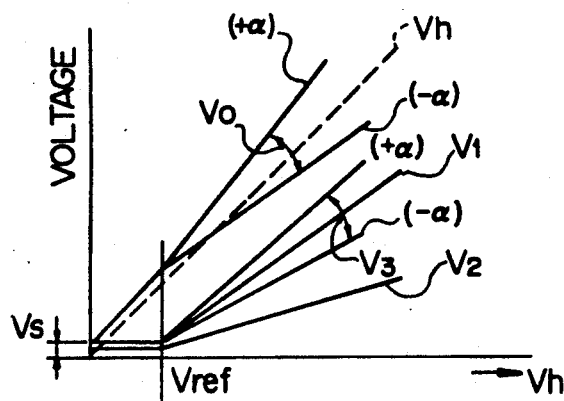
FIGS. 6(a)-6(c) are a characteristic diagram indicating operation of the thermal flow sensor shown in FIG. 4.
Figure 6:
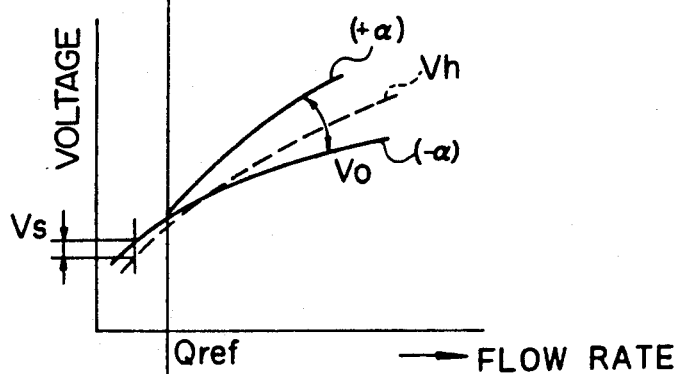
Figure 6:
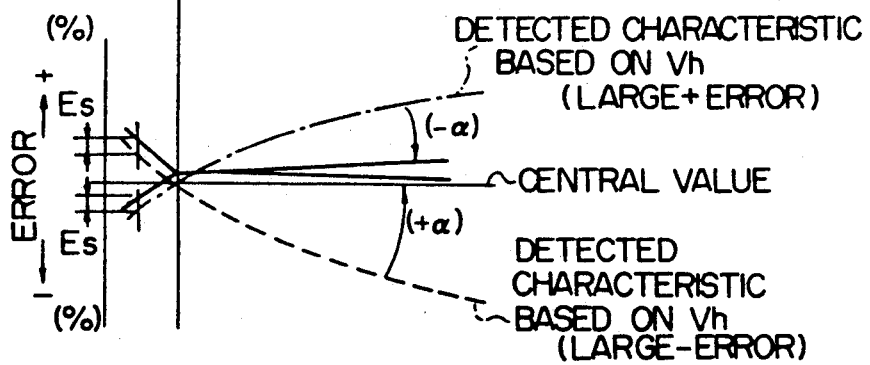
Figure 7:
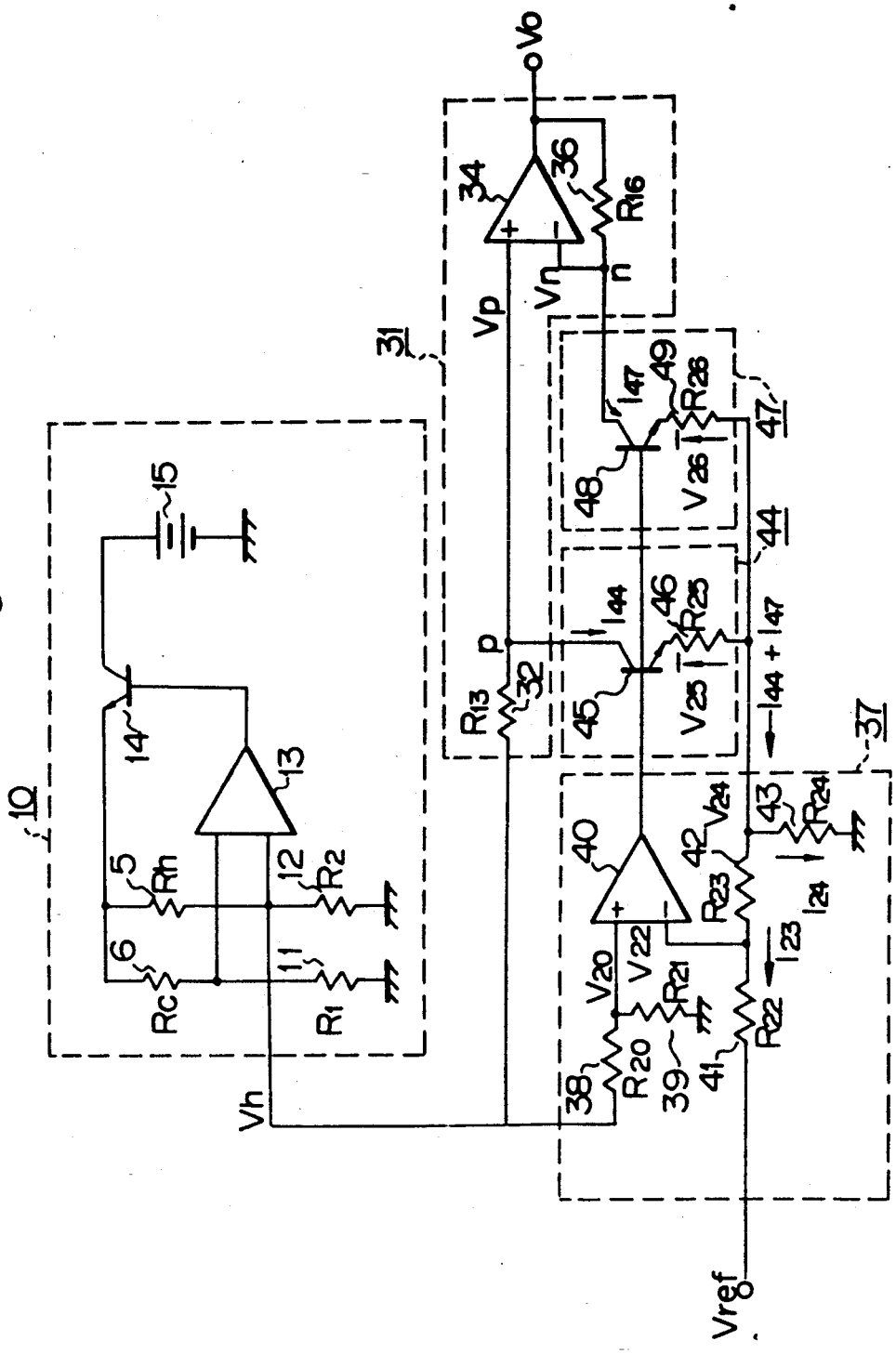
FIG. 7 is a circuit diagram indicating a first embodiment of a thermal flow sensor according to the present invention.

Preferred embodiments of the present invention will be explained hereunder with reference to the accompanying drawings. FIG. 7 is a circuit diagram indicating a gradient correcting circuit of the first embodiment according to the present invention together with a temperature control circuit. The circuits other than the gradient correcting circuit are identical to the conventional circuits described above.

In FIG. 7, the gradient correcting circuit of the first embodiment according to the present invention comprises an arithmetic circuit (31), a first constant current circuit (44), a second constant current circuit (47) and a constant current control circuit (37).

The arithmetic circuit (31) comprises resistors (32) and (36) and an operational amplifier (34), while the first constant current circuit (44) comprises a transistor (45) and a resistor (46). The collector of the transistor (45) which serves as an output terminal is connected to a connecting point p of the resistor (32) and a non-inverting input terminal of the operational amplifier (34). The second constant current circuit (47) comprises a transistor (48) and a resistor (49). The collector of the transistor (48) which serves as an output terminal is connected to a connecting point n of the inverting input terminal of the operational amplifier (34) and the resistor (36). The constant current control circuit (37) comprises resistors (38), (39), (41), (42) and (43) and an operational amplifier (40) to set a constant current value and control output current values $I_{44}$ and $I_{47}$ of the first and second constant current circuits (44) and (47) in response to output voltages $V_h$ of the temperature control circuit (10) and preset voltage $V_{ref}$. Resistance values of the resistors (32), (36), (38), (39), (41), (42), (43), (46) and (49) are defined respectively as $R_{13}$, $R_{16}$, $R_{20}$, $R_{21}$, $R_{22}$, $R_{23}$, $R_{24}$, $R_{25}$ and $R_{26}$.

As explained above, a gradient correcting means of the first embodiment comprises an arithmetic circuit (31), a first constant current circuit (44), a second constant current circuit (47) and a constant current control circuit (37).

Next, operation of the first embodiment will be explained with reference to FIGS. 8(a)-8(c) which are a characteristic diagram indicating operation of the first embodiment of the present invention.

A voltage $V_p$ input to the non-inverting input terminal of the operational amplifier (34) of the arithmetic circuit (31) is equal to a voltage value which is obtained by subtracting a drop in voltage at the resistor (32) due to the current $I_{44}$ (hereinafter referred to as a first constant current) of the first constant current circuit (44) from the output voltage $V_h$ of the temperature control circuit (10). Namely, this input voltage $V_p$ is expressed as follows:

$$V_p = V_h - R_{13} \times I_{44}$$

A voltage $V_n$ input to the inverting input terminal of the operational amplifier (34) is equal to a voltage value obtained by subtracting a drop in voltage at the resistor (36) due to the current $I_{47}$ (hereinafter referred to as a second constant current) of the second constant circuit (47) from an output voltage $V_o$. Namely, this input voltage $V_n$ is expressed as follows:

$$V_n = V_o - R_{16} \times I_{47}$$

Since the operational amplifier (34) controls the output voltage $V_o$ to cause $V_p$ to be equal to $V_n$, such an output voltage $V_o$ is expressed as follows:

$$V_o = V_h - R_{13} \times I_{44} + R_{16} \times I_{47}$$

In this equation, when the resistance values of the resistors (32) and (36) are set to adequate values, for instance, $R_{13} = R_{16}$, the output voltage $V_o$ of the arithmetic circuit (31) is expressed as follows:

$$V_o = V_h + (I_{47} - I_{44}) \times R_{13} \tag{2}$$

Operation of the first and second constant current circuits (44) and (47) and the constant current control circuit (37) will be explained hereunder.

A voltage $V_{20}$ input to a non-inverting input terminal of an operational amplifier (40) of the constant current control circuit (37) is expressed in the following because $V_{20}$ is a voltage obtained by dividing the output voltage $V_h$ of the temperature control circuit (10) with that of the resistors (38) and (39):

$$V_{20} = \{R_{21}/(R_{20}+R_{21})\} \times V_h \tag{3}$$

A voltage $V_{22}$ input to an inverting input terminal of the operational amplifier (40) is expressed in the following because $V_{22}$ is a voltage obtained by dividing a voltage equal to a difference between a voltage $V_{24}$ across the resistor (43) and the preset voltage $V_{ref}$ with resistors (41) and (42):

$$\begin{aligned} V_{22} &= \{R_{22}/(R_{22}+R_{23})\} \times (V_{24} - V_{ref}) + V_{ref} \\ &= \{R_{22}/(R_{22}+R_{23})\} \times V_{24} + \{R_{23}/(R_{22}+R_{23})\} \times V_{ref} \end{aligned} \tag{4}$$

The operational amplifier (40) controls the first and second constant currents $I_{44}$ and $I_{47}$ flowing through the resistor (43) by controlling the base currents of the transistors (45) and (48) and also controls the voltage $V_{24}$ across the resistor (43) to make $V_{20}$ equal to $V_{22}$. Therefore, the following equation can be obtained:

$$\{R_{21}/(R_{20}+R_{21})\} \times V_h = \{R_{22}/(R_{22}+R_{23})\} \times V_{24} + \{R_{23}/(R_{22}+R_{23})\} \times V_{ref}$$

From the above equation, $V_{24}$ can be obtained as follows:

$$V_{24} = \{R_{21}/(R_{20}+R_{21})\} \times \{(R_{22}+R_{23})/R_{22}\} \times V_h - (R_{23}/R_{22}) \times V_{ref}$$

In the above equation, when the resistance values are set to adequate values, for instance, $R_{20}=R_{21}$ and $R_{22}=R_{23}$, the following equation can be obtained:

$$V_{24}=V_h-V_{ref} \quad (5)$$

Since a sum of the first and the second constant currents $(I_{44}+I_{47})$ is equal to a sum of a current $I_{24}$ flowing through the resistor (43) and a current $I_{23}$ flowing through a series circuit of the resistors (23) and (22), then $$I_{44}+I_{47}=V_{24}/R_{24}+(V_{24}-V_{ref})/(R_{22}+R_{23}) \quad (6)$$

Since $V_{24}=V_h-V_{ref}$ and $R_{22}=R_{23}$, then $$I_{44}+I_{47}=(1/R_{24}+1/2R_{22})\times V_h-(1/R_{24}+1/R_{23})\times V_{ref} \quad (7)$$

In the circuit shown in FIG. 7 unlike in the conventional circuit, no sink current appears at the output terminal of the operational amplifier (40) and only a source current exists at the bases of the transistors (45) and (48). This source current becomes zero under the condition of $V_{22} \geq V_{20}$ where $V_{20}$ is the voltage input to the non-inverting input terminal of the operational amplifier (40) and $V_{22}$ is the voltage input to the inverting input terminal thereof. Therefore, the first and second constant currents $I_{44}$ and $I_{47}$ also becomes zero under the condition of $V_{22} \geq V_{20}$. Accordingly, a sum of the first and second constant currents $I_{44}+I_{47}$ becomes 0 under the condition of $V_{24}+V_{ref} \geq V_h$ from the equations (3) and (4) when $R_{20}=R_{21}$ and $R_{22}=R_{23}$.

In this case, from the equation (6) and $R_{22}=R_{23}$, $$V_{24}=\{R_{24}/(2R_{22}+R_{24})\}\times V_{ref}$$

and $V_{24}$ does not become lower than the voltage indicated by the above equation.

Accordingly, $I_{44}+I_{47}=0$ is established under the condition of $$\{1+R_{24}/(2R_{22}+R_{24})\}\times V_{ref} \geq V_h$$

Figure 8:
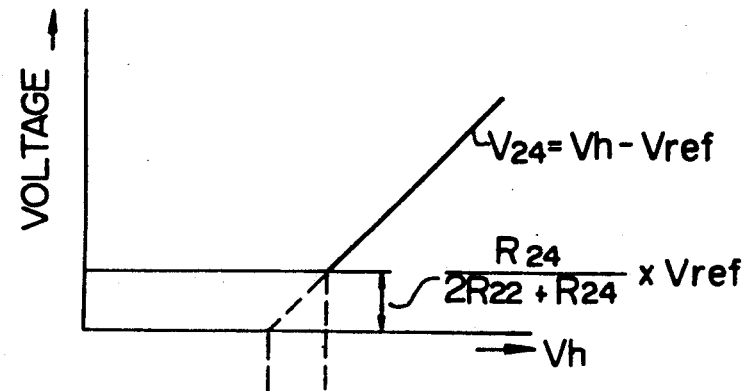
FIGS. 8(a)-8(c) are a characteristic diagram indicating operation of the flow sensor shown in FIG. 7.
Figure 8:
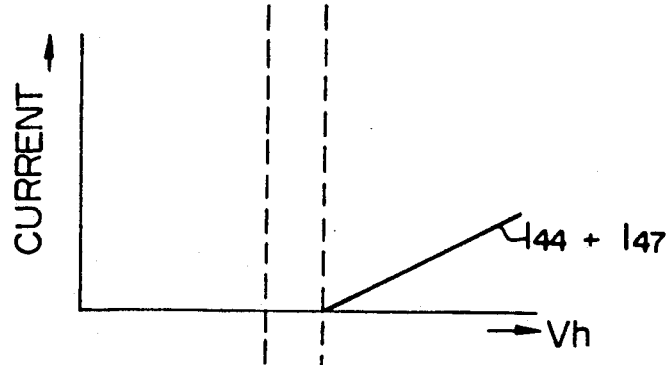
Figure 8:
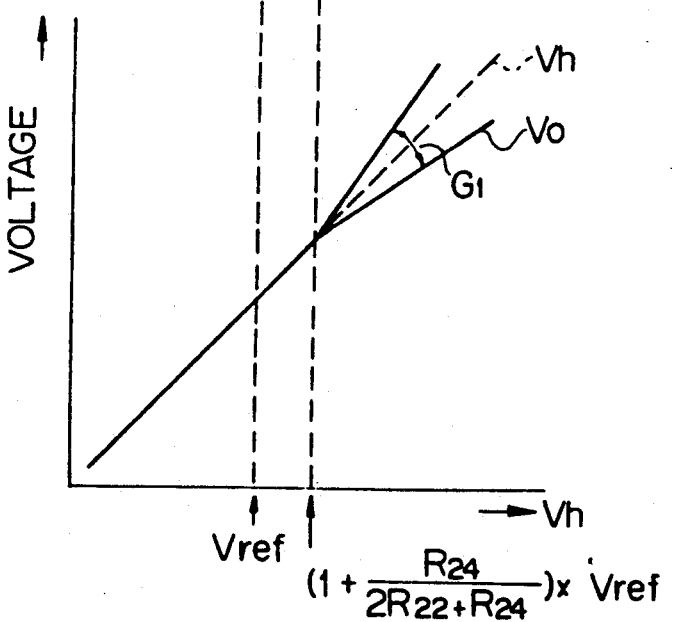

FIGS. 8(a)-8(c) show relationships between the voltage $V_h$ output from the temperature control circuit (10), the preset voltage $V_{ref}$, the voltage $V_{24}$ across the resistor (43), the first constant current $I_{44}$ and the second constant current $I_{47}$. FIG. 8(a) illustrates the equation (5) and FIG. 8(b) shows the equation (7).

Here, the ratio of the first constant current $I_{44}$ and the second constant current $I_{47}$ will be explained.

Since the bases of the transistors (45) and (48) are subject to the same voltage as they are connected to the output terminal of the operational amplifier (40), when the base-emitter voltages $V_{be}$ of the transistors (45) and (48) are equal, voltages $V_{25}$ and $V_{26}$ across the resistors (46) and (49) are also equal. Therefore, the relationship of $I_{44}=(R_{26}/R_{25})\times I_{47}$ is established from $V_{25}=I_{44}\times R_{25}$, $V_{26}=I_{47}\times R_{26}$ and $V_{25}=V_{26}$. When the ratio of resistance values of the resistors (46) and (49), $R_{26}/R_{25}$, is set to $G_1$, a difference between the first constant current and second constant current is given by the following equation from the above equation and the equation (7):

$$\begin{aligned}I_{47}-I_{44} &= \{(1-G_1)/(1+G_1)\}\times(I_{44}+I_{47}) \\ &= \{(1-G_1)/(1+G_1)\}\times\{(1/R_{24}+1/2R_{22})\times \\ &\quad V_h-(1/R_{24}+1/R_{22})\times V_{ref}\}\end{aligned}$$

When the relationship of $(I_{47}-I_{44})$ is substituted into the equation (2) representing the voltage $V_0$ output from the arithmetic circuit (31), then $$\begin{aligned}V_0 &= V_h+R_{13}\times\{(1-G_1)/(1+G_1)\}\times(I_{44}+I_{47}) \quad (8) \\ &= V_h+R_{13}\times\{(1-G_1)/(1+G_1)\}\times \\ &\quad \{(1/R_{24}+1/2R_{22})\times \\ &\quad V_h-(1/R_{24}+1/R_{22})\times V_{ref}\}\end{aligned}$$

In the equation (8), like the equation (1) which indicates the output of the conventional circuit, in accordance with the voltage $V_h$ output from the temperature control circuit (10), (1) the voltage $V_o$ output from the arithmetic circuit (31) is exactly equal to $V_h$ when $V_h \leq \{1+R_{24}/(2R_{22}+R_{24})\}\times V_{ref}$, and (2) $V_o$ is equal to $V_h$ to or from which a value determined in accordance with a difference between $V_h$ and the preset voltage $V_{ref}$; the resistance values of the resistors (32), (41), (43) and the ratio $G_1$ of resistance values $R_{25}$ and $R_{26}$ of the resistors (46) and (49) is added or subtracted when $V_h > \{1+R_{24}/(2R_{22}+R_{24})\}\times V_{ref}$.

Particularly, a value of $V_o$ can be set in the positive or negative direction with reference to $V_h$ depending on the value of $G_1$, thereby providing the same operation as the conventional gradient correcting circuit. FIG. 8(c) shows such operation.

As explained previously, a thermal flow sensor of the first embodiment according to the present invention comprises a bridge circuit positioned in a fluid and having a platinum wire (5), an air temperature sensor (6) and a plurality of resistors (11) and (12) and a temperature control circuit (10) which controls a current flowing through the platinum wire (5) so that the bridge circuit maintains a predetermined thermally balanced stage. In a gradient correcting circuit of the first embodiment according to the present invention, an output voltage $V_h$ depending on a flow rate and obtained from the bridge circuit of the temperature control circuit (10) is input to a non-inverting input terminal of an operational amplifier (34) through a resistor (32). A feedback resistor (36) is connected between an output terminal and an inverting input terminal of the operational amplifier (34) and a first constant current circuit (44) and a second constant current circuit (47) are respectively connected to the non-inverting input terminal and the inverting input terminal of the operational amplifier (34). A sum of the currents output from the first and second constant current circuits, $I_{44}+I_{47}$, is zero when the output voltage $V_h$ is equal to or lower than a predetermined value, and gradually increases from zero with the increase in the output voltage $V_h$ when the output voltage $V_h$ is larger than the predetermined value. A voltage $V_0$ output from the gradient correcting circuit is equal to $V_h$ when $V_h$ is equal to or lower than the predetermined value, and is set to be smaller or larger than $V_h$ when $V_h$ is larger than the predetermined value. This predetermined value can be adjusted by an external signal. A superior operation to that of a conventional circuit can thus be realized with a simple circuit structure. Further, since any influence exerted by saturation of a voltage from the operational amplifier, which has been disadvantageous in the prior art, can be eliminated, measurement accuracy can be enhanced.

Figure 9:
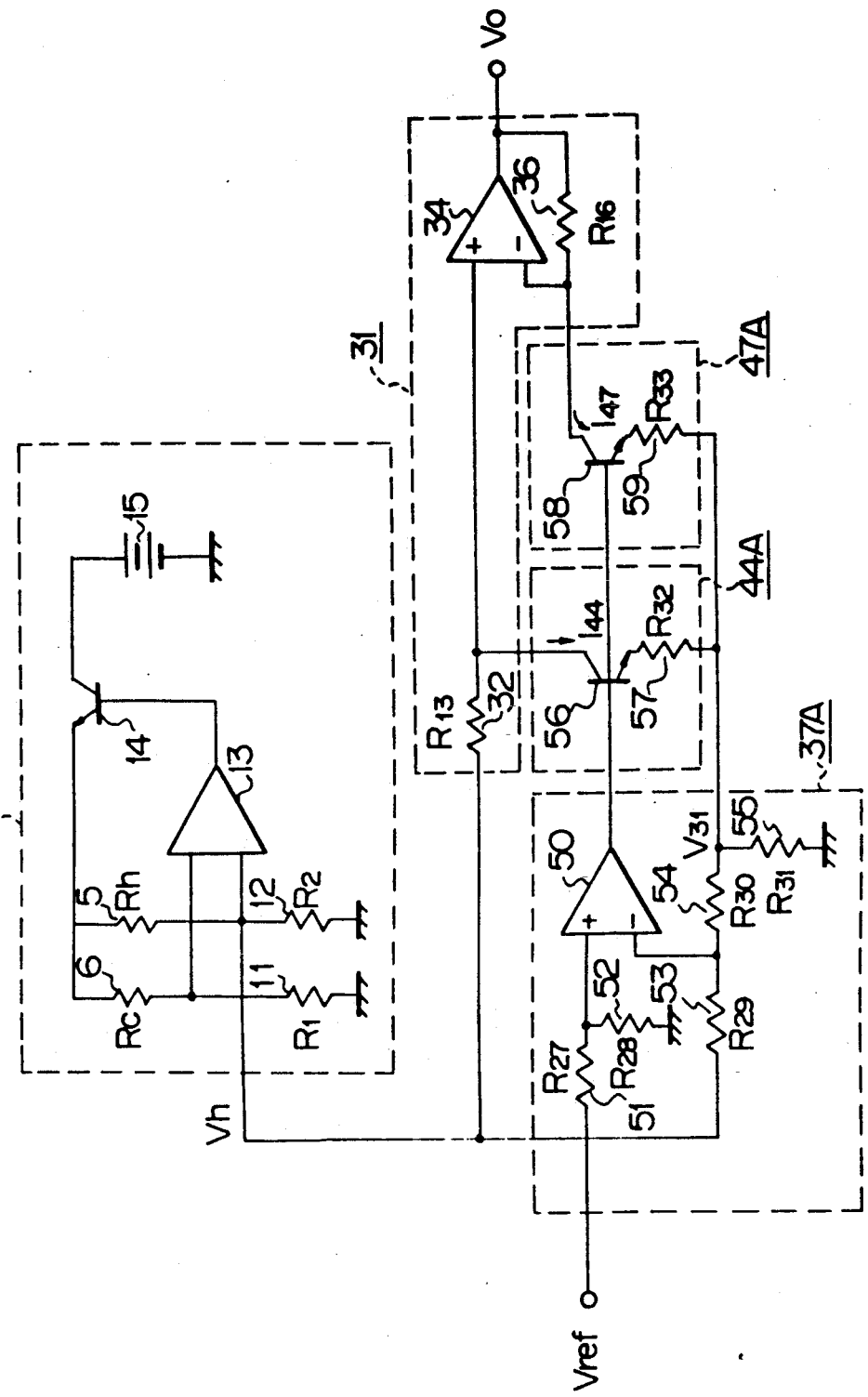
FIG. 9 is a circuit diagram indicating a second embodiment of a thermal flow sensor according to the present invention.

The structure of the gradient correcting circuit of a second embodiment according to the present invention will now be explained with reference to FIG. 9. In FIG. 9, temperature control circuit (10) and arithmetic circuit (31) are identical to those of the first embodiment shown in FIG. 7.

In FIG. 9, the gradient correcting circuit of the second embodiment according to the present invention comprises an arithmetic circuit (31), a first constant current circuit (44A), a second constant current circuit (47A) and a constant current control circuit (37A).

The first constant current circuit (44A) comprises a transistor (56) and a resistor (57), and a resistance value of the resistor (57) is defined as $R_{32}$. The second constant current circuit (47A) comprises a transistor (58) and a resistor (59). A resistance value of the resistor (59) is $R_{33}$. The constant current control circuit (37A) comprises resistors (51), (52), (53), (54) and (55) and an operational amplifier (50). A voltage $V_h$ output from the temperature control circuit (10) is supplied to an inverting input terminal of the operational amplifier (50) and the preset voltage $V_{ref}$ is supplied to a non-inverting input terminal thereof through resistors. The resistance values of the resistors (51), (52), (53), (54) and (55) are defined respectively as $R_{27}$, $R_{28}$, $R_{29}$, $R_{30}$ and $R_{31}$.

As explained above, the gradient correcting circuit in the second embodiment according to the present invention explained above comprises the arithmetic circuit (31), the first constant current circuit (44A), the second constant current circuit (47A) and the constant current control circuit (37A).

Operation of the gradient correcting circuit of the second embodiment according to the present invention will be explained next with reference to FIGS. 10(a)-10(c) indicating characteristics of the operation of the second embodiment.

Figure 10:
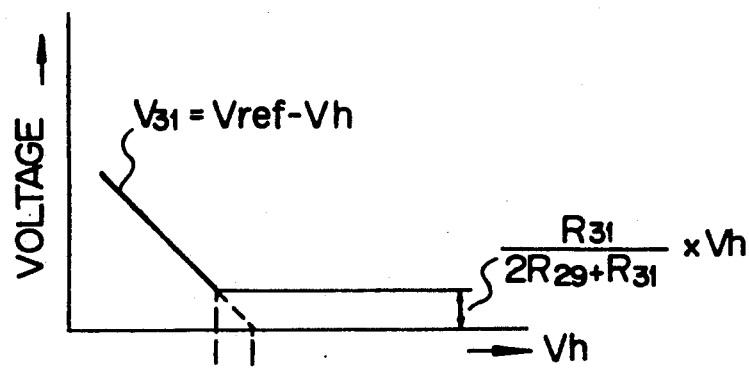
FIGS. 10(a)-10(c) are a characteristic diagram indicating operation of the flow sensor shown in FIG. 9.
Figure 10:
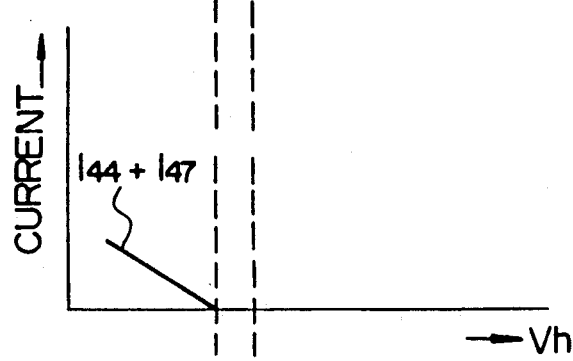
Figure 10:
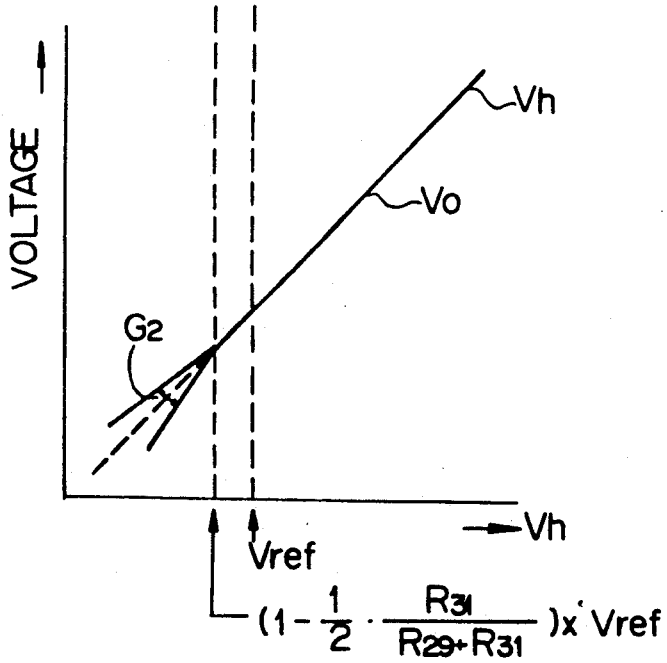

Since operation of the second embodiment is identical to that of the first embodiment except for an inverted input to the operational amplifier (50), detailed explanation thereof will be omitted. When resistance values of the resistors are defined, as in the first embodiment, as $R_{13}=R_{16}$, $R_{27}=R_{28}$ and $R_{29}=R_{30}$ and $R_{33}/R_{32}=G_2$, the following relationship is established, as in the first embodiment, among a constant current $I_{44}$ of the first constant current circuit (44A), a constant current $I_{47}$ of the second constant current circuit (47A) and a voltage $V_{31}$ across the resistor (55):

$$V_{31} = V_{ref} - V_h \quad (9)$$

Where $V_{31} > \{R_{31}/(2R_{29} + R_{31})\} \times V_h;$
$I_{44} + I_{47} = (1/R_{31} + 1/2R_{29}) \times V_{ref} - (1/R_{31} + 1/R_{29}) \times V_h$
$I_{44} + I_{47} = 0$ when $V_h > \{1 - (1/2) \times R_{31}/(R_{29} + R_{31})\} \times V_{ref};$
$V_0 = V_h + R_{13} \times \{(1 - G_2)/(1 + G_2)\} \times (I_{44} + I_{47})$
$= V_h + R_{13} \times \{(1 - G_2)/(1 + G_2)\} \times$
$\quad (1/R_{31} + 1/2R_{29}) \times V_{ref} - (1/R_{31} + 1/R_{29}) \times V_h\}$ FIGS. 10(a)-10(c) are characteristic diagrams indicating values of $V_{31}$, $I_{44}+I_{47}$ and $V_0$. As seen from FIGS. 10(a)-10(c), by changing the ratio $G_2$ of $R_{33}$ and $R_{32}$, $V_0$ is equal to $V_h$ which a value corresponding to a difference between $V_h$ and $V_{ref}$ is added to or subtracted from under the condition of $$V_h < \{1-(\tfrac{1}{2}) \times R_{31}/(R_{29}+R_{31})\} \times V_{ref},$$

and $V_0$ is equal to $V_h$ under the condition of $$V_h > \{1-(\tfrac{1}{2}) \times R_{31}/(R_{29}+R_{31})\} \times V_{ref}.$$

As explained above, in the second embodiment of the present invention, a thermal flow sensor comprises a bridge circuit positioned in a fluid and having a platinum wire (5), an air temperature sensor (6) and a plurality of resistors (11) and (12) and a temperature control circuit (10) for controlling a current flowing through the platinum wire (5) so as to maintain a predetermined thermally balanced stage in the bridge circuit. In a gradient correcting circuit of the second embodiment according to the present invention, an output voltage $V_h$ depending on a flow rate and obtained from the bridge circuit of the temperature control circuit (10) is input to a non-inverting input terminal of an operational amplifier (34) through a resistor (32). A feedback resistor (36) is connected between an output terminal and an inverting input terminal of the operational amplifier (34) and a first constant current circuit (44A) and a second constant current circuit (47A) are respectively connected to the non-inverting input terminal and the inverting input terminal of the operational amplifier (34). A sum of the currents output from the first and second constant current circuits, $I_{44}+I_{47}$, is equal to zero when the output voltage $V_h$ is larger than a predetermined value and gradually decreases with a drop in the output voltage $V_h$ when $V_h$ is smaller than the predetermined value. The voltage $V_0$ output from the gradient correcting circuit is equal to $V_h$ when $V_h$ is larger than the predetermined value, and $V_0$ is set to be larger or smaller than $V_h$ when $V_h$ is smaller than the predetermined value. The predetermined value can be adjusted by means of an external signal. Therefore, superior operation to that of circuit of the prior art can be realized with a simple circuit structure. Further, any influence of saturation of a voltage from the operational amplifier, which has been disadvantageous in the prior art, can also be eliminated, measurement accuracy can be enhanced.

A gradient correcting circuit of the third embodiment according to the present invention will next be explained with reference to FIG. 11. The gradient correcting circuit of the third embodiment shown in FIG. 11 is considered to be a combination of the first and second embodiments connected in parallel with the arithmetic circuit (31).

A gradient correcting means of the third embodiment comprises an arithmetic circuit (31), a first constant current circuit (44), a second constant current circuit (47), a third constant current circuit (44A), a fourth constant current circuit (47A) and first and second constant current control circuits (37) and (37A).

Next, operation of the third embodiment will be explained with reference to FIG. 12 indicating operation characteristics of the third embodiment.

Figure 11:
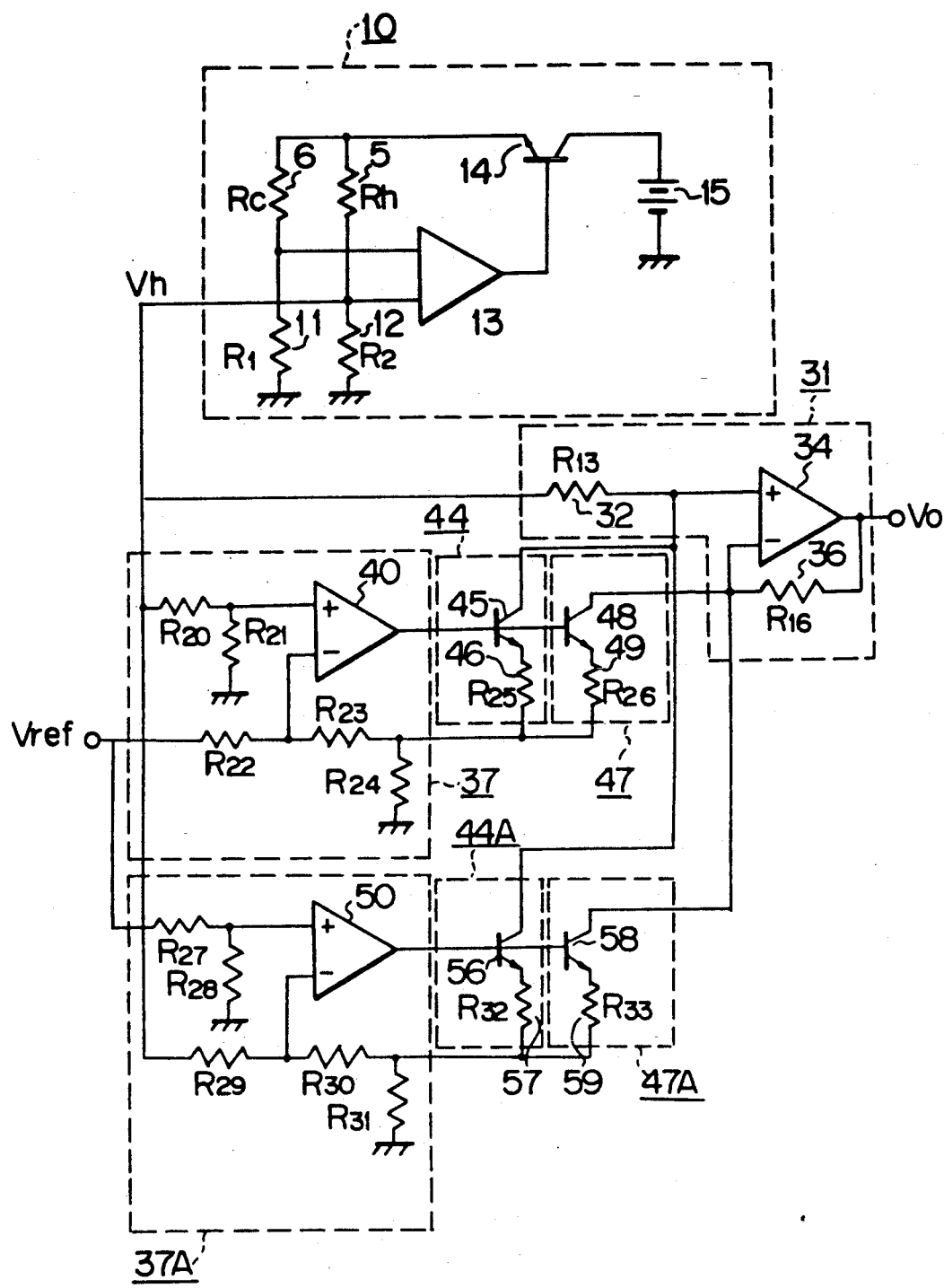
FIG. 11 is a circuit diagram indicating a third embodiment of a thermal flow sensor according to the present invention.
Figure 12:
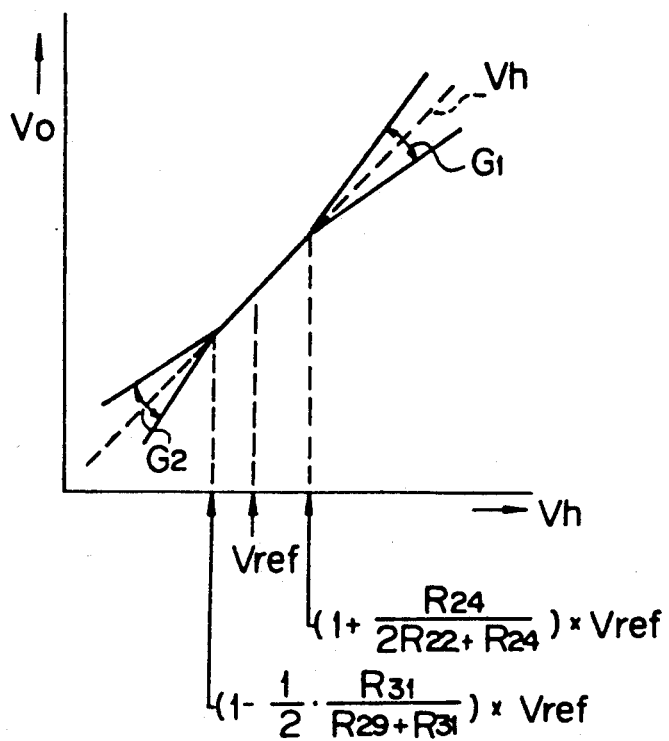
FIG. 12 is a characteristic diagram indicating operation of the flow sensor shown in FIG. 11.

FIG. 12 shows characteristics of a voltage $V_o$ output from the arithmetic circuit (31) of FIG. 11 with reference to a voltage $V_h$ output from the temperature control circuit (10).

As seen from FIG. 12, a characteristic of $V_o$ can be corrected (1) by changing the ratio $G_1$ of resistance values of $R_{25}$ and $R_{26}$ of resistors (46) and (49) under the condition of $$V_h > \{1 + R_{24}/(2R_{22} + R_{24})\} \times V_{ref}$$

and (2) by changing the ratio $G_2$ of resistance values $R_{32}$ and $R_{33}$ of resistors (57) and (59) under the condition of $$V_h < \{1 - (\frac{1}{2}) \times R_{31}/(R_{29} + R_{31})\} \times V_{ref}$$

When $V_h$ takes a value between these limit values, $V_o = V_h$.

In the third embodiment of the present invention, as explained above, a thermal flow sensor comprises a bridge circuit positioned in a fluid and having a platinum wire (5), a temperature sensor (6) and a plurality of resistors (11) and (12) and a temperature control circuit (10) for controlling a current flowing through the platinum wire (5) so as to control the bridge circuit and maintain a predetermined thermally balanced stage. In a gradient correcting circuit of the third embodiment according to the present invention, an output voltage $V_h$ depending on a flow rate and obtained from the bridge circuit of the temperature control circuit (10) is input to a non-inverting input terminal of an operational amplifier (34) through a resistor (32). A feedback resistor (36) is connected between an output terminal and an inverting input terminal of the operational amplifier (34) and the first and second constant current circuits (44), (47) and the third and fourth constant current circuits (44A), (47A) are respectively connected to the non-inverting input terminal and the inverting input terminal of the operational amplifier (34). A sum of the currents output from the first and second constant current circuits (44) and (47) and a sum of the currents output from the third and fourth constant current circuits (44A) and (47A) are controlled in accordance with the output voltage $V_h$ such that the output voltage $V_o$ of the gradient correcting circuit is set to be equal to $V_h$ when $V_h$ is between two larger and smaller predetermined values, and is set to be larger or smaller than $V_h$ when $V_h$ is out of the range defined by the predetermined values. The predetermined values can be adjusted by an external circuit. Therefore, operation superior to that of a circuit of the prior art can be performed with a simple circuit structure. Further, any influence of saturation of a voltage from the operational amplifier, which has been disadvantageous in the prior art, can be eliminated and measurement accuracy can be enhanced.

As explained above, the present invention provides a thermal flow sensor comprising a bridge circuit positioned in a fluid and having a thermal resistor and a plurality of resistors and a temperature control means for controlling a current flowing through the thermal resistor to maintain the bridge circuit at a predetermined thermally balanced stage, a gradient of characteristic of the output voltage can easily be compensated for and measurement accuracy can be enhanced with a simple circuit structure; the flow sensor comprising a gradient comprising circuit which produces a voltage equal to the output voltage when an output voltage depending on a flow rate and obtained by the bridge circuit of the temperature control means is within a predetermined range, and is larger or smaller than such an output voltage when the output voltage is out of the predetermined range.

What is claimed is:

1. A thermal flow sensor, comprising, a temperature control means including a bridge circuit positioned in a fluid and including a thermal resistor and a plurality of resistors for controlling a current flowing through said thermal resistor to maintain said bridge circuit in a predetermined thermally balanced state; an operational amplifier (34) for receiving a voltage corresponding to a flow rate obtained from said bridge circuit of said temperature control means at a non-inverting input terminal; first and second current generating circuits (44,47; 44A,47A) connected respectively to the non-inverting input terminal and an inverting input terminal of said operational amplifier, and a current control circuit (37; 37A) for controlling the first and second current generating circuits in accordance with the flow rate voltage from the bridge circuit such that a sum of the currents output therefrom results in a voltage output from said operational amplifier having a first gradient over a first range of voltage from said bridge and at least a second gradient over a second range of voltage from said bridge.

2. A thermal flow sensor according to claim 1, wherein the current control circuit controls the first and second current generating circuits such that a sum of the currents output therefrom is zero when a voltage output from said bridge circuit is equal to or less than a predetermined value, and gradually increases with an increase in the output voltage when the output voltage is larger than the predetermined value.

3. A thermal flow sensor according to claim 1, wherein the current control circuit controls the first and second current generating circuits such that a sum of the currents output therefrom is zero when a voltage output from said bridge circuit is equal to or larger than a predetermined value, and gradually increases with a drop in the output voltage when the output voltage is less than the predetermined value.

4. A thermal flow sensor according to claim 1, further comprising third and fourth current generating circuits respectively connected to the non-inverting input terminal and the inverting input terminal of said operational amplifier to control a sum of the currents output from said first and second current generating circuits and a sum of the currents output from said third and fourth current generating circuits in accordance with the voltage output from said bridge circuit, the ratio of the current values of said first and second current generating circuits and the ratio of the current values of said third and fourth current generating circuits being variably set.

* * * * *